United States Patent Office 3,755,538
Patented Aug. 28, 1973

3,755,538
PREPARATION OF ZEOLITES
Edwin W. Albers, Annapolis, Grant C. Edwards, Silver Spring, and David E. W. Vaughan, Ellicott City, Md., assignors to W. R. Grace & Co., New York, N.Y.
No Drawing. Filed Oct. 8, 1971, Ser. No. 187,858
Int. Cl. C01b 33/28
U.S. Cl. 423—329                                12 Claims

ABSTRACT OF THE DISCLOSURE

Crystalline zeolites are prepared by reacting precursor mixtures of silica, alumina, alkali metal, hydroxide and water to which have been added a minor quantity of a composition which is highly active for initiation of crystallization of the desired zeolite from the precursor reaction mixture. The composition which is highly active for the production of zeolites comprises a reacted aqueous slurry of alkali metal hydroxide, alumina, silica, water and a minor quantity of an additive selected from the group consisting of boron, vanadium, phosphorus, molybdenum, tungsten, germanium, gallium, and mixtures thereof.

---

The present invention relates to the preparation of synthetic zeolites, and more specifically to an improved method for producing substantially theoretical yields of high quality crystalline zeolites in a fraction of the reaction time heretofore required for the production of such zeolites.

Crystalline zeolites of relatively recent commercial significance are crystalline alumino silicates typically of the so-called type A, X and Y types. These synthetic zeolites are characterized by crystalline structures which render them particularly suitable for commercial absorbent and catalytic applications. It has long been known that these synthetic crystalline zeolites may be obtained by the extended hydrothermal reaction of suitable reaction mixtures of inorganic oxides.

Requirements for large commercial quantities of zeolites, of the so-called type X and Y synthetic faujasite types, has created a need for improved procedures for the production of such zeolites. It has been suggested that good yields of commercial quantities of synthetic faujasite may be within reasonable reaction times through the use of improved raw materials and through the use of refined production techniques. These improved prior art techniques have resulted in commercial zeolite production procedures wherein substantial yields of zeolites are consistently obtained by way of reaction periods which extend for periods of about 24 to 48 hours in lieu of the several days initially required by early conventional procedures.

It is found, however, that in order to produce tonnage quantities of zeolites of a commercial scale, particularly large quantities of high silica containing synthetic faujasite, reaction periods of less than 24 hours are desirable for economical operation.

It is therefore an object of the present invention to provide an improved method for preparing crystalline zeolites.

It is still a further object to provide a method by which high quality crystalline alumino silicates of the type X and Y synthetic faujasite type may be quickly and economically prepared.

It is another object to provide a highly active crystallization initiator composition which may be utilized to produce high yields of zeolites in a fraction of the reaction time heretofore required for commercial scale zeolite synthesis.

It is yet another object to provide an improved commercial process for preparing synthetic faujasite which possesses a high silica to alumina ratio from inexpensive raw materials using a novel, highly active crystallization initiator composition disclosed herein.

These and still further objects of the present invention will become readily apparent to one skilled in the art from the following detailed description and specific examples.

Broadly, our invention contemplates the preparation of a highly active crystallization initiator slurry which contains alkali metal oxide, silica, alumina, water and small amounts of a compound selected from the group consisting of boron, vanadium, phosphorus, molybdenum, tungsten, germanium and gallium. This high activity crystallization initiator (hereinafter frequently referred to as HACI) slurry is added in small amounts to a zeolite precursor reaction mixture which contains conventional quantities of alkali metal oxide (A—$M_2O$), silica ($SiO_2$), alumina ($Al_2O_3$) and water ($H_2O$), and reacted to form substantial yields of zeolite within a short period of time.

More specifically, we have found that a HACI slurry useful for the production of crystalline zeolites, and crystalline aluminosilicates, in particular may be prepared by admixing the following broad and more specifically defined ranges of ratios of ingredients expressed in terms of moles of the respective oxides:

| Ingredient (oxide) | Amount (moles) | | |
|---|---|---|---|
| A—$M_2O$ | 8 to 30 | 10 to 25 | 14 to 18 |
| M′O (M′O, M′$O_2$, M′$_2O_3$, etc.) | 0.01 to 5 | 0.5 to 2.0 | 1.0 |
| $Al_2O_3$ | 0.1 to 4.0 | 0.75 to 2.0 | 0.5 to 1.0 |
| $SiO_2$ | 5 to 50 | 12 to 20 | 14 to 18 |
| $H_2O$ | 50 to 1,500 | 200 to 700 | 200 to 350 | wherein A—M represents alkali metal, sodium and potassium in particular, and M′ represents B, V, P, Mo, W, Ge, Ga, and mixtures thereof. The reaction mixtures which contain the above ingredients are reacted at temperatures on the order of from about −10 to 110° C. for a period of 5 minutes to 240 hours, and preferably at a temperature of 0 to 35° C. for a period of from about 10 to 60 hours, to obtain a slurry of finely divided solids which possesses no detectable crystallinity when examined by standard X-ray diffraction analysis techniques. In use, the resultant HACI slurries are incorporated into a precursor reaction mixture in amounts to provide from about 0.1 to 30 percent (on a mole basis) and preferably 0.25 to 15 percent of the alumina ingredient of the final reaction mixture used to produce the crystalline zeolite.

The reaction mixtures used when it is desired to produce the synthetic faujasite having a silica to alumina ratio of from about 2.0 to 3.0 (type X) are as follows:

| Ingredients (oxide) | Amount (moles) |
|---|---|
| M—$A_2O$ | 2–4 |
| $SiO_2$ | 2–5 |
| $Al_2O_3$ | 0.5–1.5 |
| $H_2O$ | 50–400 |

To obtain type X synthetic faujasite from the above precursor reaction mixtures to which have been added the desired quantity of HACI, the mixture is reacted at a temperature of from about 80 to 120° C. for a period of from about 2 to 20 hours. It is of particular interest to note that using the above generally defined technique substantial yields, i.e. on the order of 80 to 98 percent of theory based on the alumina content, are obtained in as little as 1½ hours.

When the desired product is synthetic faujasite having a relatively high silica to alumina ratio on the order of 3.0 to 6.0 (type Y) the preferred precursor reaction mixtures will contain the following preferred ratio of ingredients:

| Ingredient (oxide) | Amount (moles) for 4.0 SiO$_2$:Al$_2$O$_3$ | Ratios | Amount (moles) for 5.0 SiO$_2$:Al$_2$O$_3$ | Ratios |
| --- | --- | --- | --- | --- |
| M—A$_2$O | 4 | Na$_2$O/SiO$_2$=2–4 | [1] 6.6 | Na$_2$O/SiO$_2$=2–4 |
| Al$_2$O$_3$ | 1 | Na$_2$O/Al$_2$O$_3$=3–5 | 1 | Na$_2$O/Al$_2$O$_3$=3–7 |
| SiO$_2$ | 10 | Na$_2$O/H$_2$O=30–70 | 16 | Na$_2$O/H$_2$O=30–75 |
| H$_2$O | 140 | | 280 | |

[1] 3.5 Na$_2$O:1 Al$_2$O$_3$:10 SiO$_2$:220 H$_2$O can also be used, but the reaction is much slower.

To obtain a synthetic faujasite having a high silica content, the above precursor reaction mixtures, to which have been added the desired percentage of HACI, are reacted at temperatures ranging from about 60 to 120° C. and preferably on the order of 90 to 110° C. for a period of 3 to 10 hours. The reaction periods as little as 4 hours will produce on the order of 80 to 95 percent of the desired crystalline faujasite.

To produce the present highly active crystallization initiators alkali metal oxide, alumina, silica, water and minor amounts of boron, vanadium, phosphorus, molybdenum, tungsten, germanium, and/or gallium are hydrothermally reacted in amounts and at temperatures at periods generally indicated above. The source of the alkali metal oxide ingredient is typically sodium or potassium hydroxide or suitable salts thereof such as oxides, carbonates, silicates, aluminates, bicarbonates, etc.

The alumina ingredient is preferably derived from sodium aluminate, however, it is also contemplated that alumina as derived from other soluble salts may be utilized, such as sulfates, chlorides, acetates, nitrates, as well as solutions derived by the dissolution by sodium or potassium hydroxide solutions of oxides, hydrated oxides, hydroxides and hydrated hydroxides of aluminum. The silica ingredient is preferably obtained from sodium silicate, however, other sources of silica such as follows may be used: silica powder such as HiSil, Cabosil, etc.; silica sol such as Ludox, Styron, etc.; silica gel, hydrogel, or hydrosol.

The minor quantities of boron, vanadium, phosphorus, molybdenum, tungsten, germanium, and gallium utilized to produce the novel crystallization initiator solutions may be derived from practically any soluble source material. When boron is added or utilized in the preparation of the present HACI slurry, typical sources of boron are boric acid, sodium tetraborate, sodium metaborate, and sodium borate. Where vanadium is the preferred metal ingredient sources of vanadium such as vanadium pentoxide, ammonium metavanadate, sodium vanadates, potassium vanadates, or other soluble vanadium salts are used.

Phosphorus sources used in the preparation of the HACI mixtures are sodium phosphate (Na$_3$PO$_4$), sodium metaphosphate (NaPO$_3$), and sodium pyrophosphate (Na$_4$P$_2$O$_7$)

including the various hydrated, acid, and polymerized forms.

When molybdenum is utilized, sources of molybdate such as molybdenum trioxide, molybdic acid, ammonium paramolybdate, sodium molybdates, potassium molybdate, or phosphomolybdic acid are used.

Tungsten in the form of tungstic acid, or sodium tungstates is preferred.

Gallium may be utilized as the acetate, bromide, perchlorate, chloride, nitrate, sulfate, etc.

It is also contemplated that mixtures of the above noted boron, vanadium, phosphorus, molybdenum, tungsten, germanium and gallium components may also be utilized to form the desired HACI slurry.

The zeolite precursor reaction mixtures to which the present HACI slurries may be added are described above. In general, the precursor reaction mixture will possess a ratio of ingredients, normally alumina, silicate, alkali metal hydroxide and water in ratios which are generally disclosed in the prior art as being capable of producing the desired crystalline zeolites. The precursor reaction mixtures are formed by admixing suitable compounds which provide alumina, silicate, alkali metal hydroxide and water. These compounds are essentially the same as those above indicated for the use in the formation of HACI mixtures. In general, to produce synthetic faujasite, it is desirable to use mixtures of sodium silicate, sodium aluminate, and sodium hydroxide. While it is generally preferred ot utilize so-called totally synthetic reaction mixtures, it is contemplated that precursor reaction mixtures which contain natural clay type materials, and other sources of silica and alumina such as diatomaceous earth may also be utilized.

The amount of HACI additive utilized to produce the desired synthetic crystalline zeolite by the method contemplated herein will vary according to the particular zeolite produced. However, when it is desired to produce a synthetic faujasite having a relatively high silica to alumina ratio on the order of from about 4 to 6 it is desired to use sufficient HACI to constitute from about 0.2 to about 30 mole percent of the alumina present in the above defined zeolite precursor reaction mixtures. For example, where it is desired to produce a synthetic faujasite from 1000 g. of a typical precursor reaction mixture which comprises molar ratios of Na$_2$O, Al$_2$O$_3$, SiO$_2$ and H$_2$O of 7:1:16:280 respectively 2 to 353 g. of the HACI slurry having a typical ratio of Na$_2$O, B$_2$O$_3$, Al$_2$O$_3$, SiO$_2$, and H$_2$O of 16:1:1:15:320 respectively will be added to provide 0.2 to 30 percent (on a mole basis) of the Al$_2$O$_3$ present in the final reaction slurry. Where it is desired to obtain a synthetic zeolite product having a particularly small particle size on the order of 0.1 to 1.0 micron, and more preferably 0.1 to 0.3 micron, an amount of HACI is employed which falls within the upper limit of the range described above, i.e., preferably 15 to 30 mole percent of the alumina present in the final reaction slurry.

In using the present HACI slurry with the zeolite precursor slurries, the overall reaction mixture is prepared by first preparing the HACI slurry as described above, and then adding the resultant HACI slurry to the zeolite precursor slurry. The time which elapses between preparation of the HACI slurry and addition of HACl to the zeolite precursor slurry is critical under certain conditions. Where the HACI is prepared using temperatures below about 50° C., the HACI may be held almost indefinitely before addition to the zeolite precursor mixture. However, if the HACI reaction mixture is heated at 50 to 100° C. for 15 to 120 minutes it should be added to the zeolite precursor mixture within about 30 minutes, and preferably immediately, after preparation.

Subsequent to combining the HACI slurry with the precursor slurry, the mixture is vigorously blended and reacted at a temperature of about 60 to 120° C. for about at least 2 hours to produce the desired crystalline zeolite.

It is generally found that substantially theoretical yields of zeolite are produced within a period of 3 to 7 hours (depending on zeolite prepared and the amount of HACI slurry added). Typically where a faujasite having a silica to alumina ratio of about 5 is produced and a reaction temperature of 103° C. is utilized, products possessing 90 to 100 percent crystallinity are readily obtained in a period of about 3 hours. The resultant faujasite product will process a particle size on the order of 0.2 to 2.0 microns. The surface area of the product is normally on the order of 850 to 950 m.²/g.

The zeolites produced by way of the present invention find numerous applications in the preparation of absorbent and catalyst compositions. In particular, it is found that the synthetic faujasites possessing silica to alumina ratios on the order of 4 to 6 possess valuable catalytic properties when utilized in the preparation of catalysts for the cracking of hydrocarbons at elevated temperature.

Having described the basic aspects of the present invention the following examples are given to illustrate specific embodiments thereof:

EXAMPLE I

Preparation of HACI slurry

A sodium aluminate solution containing 26 g. of $$Al_2O_3 \cdot 3H_2O$$

dissolved in a solution of 153 g. sodium hydroxide and 300 g. of water was prepared. A sodium silicate solution containing 554 g. sodium silicate solution which is 27.1 percent $SiO_2$ and 8.3 percent $Na_2O$ was mixed with 260 g. water in which are dissolved 5 g. of boric acid. The sodium silicate solution which contains a boric acid was added to the aluminate solution, and the mixture aged at a temperature of about 15–30° C. for about 24 hours.

The above procedure was repeated, however, the amount of boric acid added to the preparation was steadily increased. Tabulated below are the molar oxide formulae of the HACI slurries prepared in the above manner and the properties of the faujasite products obtained when these HACI slurries are added at the 5 percent level, to a slurry composition of $$16\ Na_2O:Al_2O_3:15SiO_2:320H_2O$$

Also included is an example of the same slurry promoted with a non-boron HACI.

faujasite precursor slurry which contained the following ratio of oxides: 7 $Na_2O:1Al_2O_3:16SiO_2:280H_2O$. This slurry ratio includes the contribution of the HACI slurry; therefore if the amount of HACI is varied, the slurry ratio changes. However, the slurry including various quantities of the HACI can be made up to 7:1:16:280 by varying all reactants appropriately. The slurry was prepared by combining the following:

A solution of 35.5 g. $Al_2O_3 \cdot 3H_2O$ dissolved in a solution of 32 g. NaOH and 50 g. water; after the $$Al_2O_3 \cdot 3H_2O$$

dissolves, the solution is diluted with 125 g. water. The above solution is added to 803 g. sodium silicate solution (3.25 $SiO_2:Na_2O$ weight ratio; 24.7% $SiO_2$ and 8.4% $Na_2O$) mixed with 422 g. water.

To the above precursor slurry varying amounts of the HACI slurries prepared by Example I, IV, and V were added. The combined reaction mixture was then heated at a temperature of 95° C. for various periods to produce a crystalline faujasite which possessed a silica to alumina ratio of about 4.7±:0.3, surface areas as indicated below and a particle size of 0.4 to 0.6 microns.

TABLE

| Run number | Reaction time (hr.) | HACI Sample number | HACI Amount, wt. percent | Faujasite SA (m.²/g.) |
|---|---|---|---|---|
| 1 | 3 | 4 | 6 | 400 |
| 1 | 5 | 4 | 6 | 800 |
| 2 | 3 | 4 | 10 | 400 |
| 2 | 5 | 4 | 10 | 850 |
| 3 | 3 | 5 | 6 | 200 |
| 3 | 5 | 5 | 6 | 500 |
| 3 | 7 | 5 | 6 | 800 |
| 4 | 3 | 5 | 10 | 300 |
| 4 | 7 | 5 | 10 | 850 |

EXAMPLE III

Slurries were prepared having ratios of reactants the same as those given in Example I, except that boron was

TABLE

| Sample number | HACI slurry composition | | | | | Reaction time (hrs.) | Surface area product (m.²/g.) |
|---|---|---|---|---|---|---|---|
| | $Na_2O$ : | $Al_2O_3$ : | $SiO_2$ : | $B_2O_3$ : | $H_2O$ | | |
| 1 | 16 | 1 | 15 | 0 | 320 | 3 | 200 |
| 1 | | | | | | 6 | 500 |
| 2 | 16 | 1 | 15 | 0.2 | 320 | 3 | 550 |
| 2 | | | | | | 6 | 700 |
| 3 | 16 | 1 | 15 | 0.5 | 320 | 3 | 500 |
| 3 | | | | | | 6 | 750 |
| 4 | 16 | 1 | 15 | 1.0 | 320 | 3 | 380 |
| 4 | | | | | | 6 | 600 |
| 5 | 16 | 1 | 15 | 2.0 | 320 | 3 | 100 |
| 5 | | | | | | 6 | 700 |

EXAMPLE II

Preparation of high silica faujasite

Using the HACI slurries obtained in Example I, various amounts of the HACI slurries were added to a replaced by other metals in the HACI slurry. 5 volume percent of the HACI slurry was added to the appropriate synthesis slurries with the following results (a standard seed slurry is included for comparison purposes).

TABLE

| Run number | HACI slurry composition | | | | | | Reaction time (hours) | Surface area of product |
|---|---|---|---|---|---|---|---|---|
| | $Na_2O$ : | $Al_2O_3$ : | MO | : | $SiO_2$ : | $H_2O$ | M salt | | |
| 1 | 16 | 1 | 0.2 $V_2O_5$ | | 15 | 320 | $NH_4VO_3$ | 3 | 560 |
| 1 | | | | | | | | 6 | 900 |
| 2 | 16 | 1 | 1.0 $WO_3$ | | 15 | 320 | $WO_3$ | 3 | 100 |
| 2 | | | | | | | | 6 | 700 |
| 3 | 16 | 1 | 0.7 CoO | | 15 | 320 | $CoCl_2 6H_2O$ | 3 | 100 |
| 3 | | | | | | | | 6 | 650 |
| 4 | 16 | 1 | 2.0 $MoO_3$ | | 15 | 320 | $MoO_3$ | 3 | 50 |
| 4 | | | | | | | | 6 | 700 |
| 5 | 16 | 1 | 0.25 $P_2O_5$ | | 15 | 320 | $NaH_2PO_4 \cdot 2H_2O$ | 3 | 600 |
| 5 | | | | | | | | 6 | 750 |
| 6 | 16 | 1 | | | 15 | 320 | | 3 | 200 |
| 6 | | | | | | | | 6 | 500 |

EXAMPLE IV

This example demonstrates that a zeolite synthesis slurry containing sufficient HACl to supply 20% of the slurry alumina produces small particle NaY.

30 grams alumina trihydrate was dissolved in a solution containing 25 grams sodium hydroxide and 50 milliliters of water. After the alumina trihydrate dissolved, 125 milliliters more water was added to obtain solution A. 19 milliliters of concentrated sulfuric acid (96% $H_2SO_4$) was added to 263 milliliters water. Then the dilute acid was slowly added with vigorous stirring to 701 grams of sodium silicate solution (26.7% $SiO_2$; 8.2% $Na_2O$) to make solution B. Solution A was blended into solution B slowly with stirring; then 282 milliliters HACl solution having a mole ratio of 16 $Na_2O$ : 1 $Al_2O_3$ : 15 $SiO_2$ : 320 $H_2O$ was added with stirring. The mixture was heated at 100° C. for five hours. The product was NaY faujasite with a surface area of 825 m.$^2$/g. and a 0.2 micron particle size.

The above examples clearly illustrate that substantial yields of crystalline zeolites may be quickly and economically obtained using the practice of the present invention.

We claim:

1. A method for preparing crystalline zeolites which comprises:
   (a) preparing an amorphous crystallization initiator composition by a process which comprises:
      (1) preparing a reaction mixture containing the following mol proportions of ingredients:

| | |
      |---|---|
      | (1) A—$M_2O$ | 8 to 30 |
      | (2) M'O | 0.01 to 5 |
      | (3) $Al_2O_3$ | 0.1 to 4.0 |
      | (4) $SiO_2$ | 5 to 50 |
      | (5) $H_2O$ | 50 to 1500 | wherein A—M is an alkali metal and M' is selected from the group consisting of B, V, P, Co, Mo, W, Ge, Ga, and mixtures thereof, and
      (2) aging said mixture for a period of at least 5 minutes to obtain a slurry of amorphous particles;
   (b) preparing a crystalline zeolite precursor reaction mixture comprising $Al_2O_3$, $SiO_2$, $H_2O$, and A—$M_2O$ wherein A—M is alkali metal;
   (c) adding an amount of the composition of step (a) to said precursor reaction mixture sufficient to provide from about 0.10 to 30% of the $Al_2O_3$ required for said mixture; and
   (d) reacting the mixture obtained in step (c) at a temperature of from about 60 to 120° C. to obtain crystalline zeolite.

2. The method of claim 1 wherein said aging is conducted for a period of about 10 to 60 hours at a temperature of between 0° and 35° C.

3. The method of claim 1 wherein said aging is conducted at a temperature of —10 to 110° C. for between 5 min. and 240 hours.

4. The method of claim 1 wherein said mole proportions of ingredients falls within the following ranges:

| | |
|---|---|
| (1) A—$M_2O$ | 10 to 25 |
| (2) M'O | 0.5 to 2.0 |
| (3) $Al_2O_3$ | 0.75 to 2.0 |
| (4) $SiO_2$ | 12 to 20 |
| (5) $H_2O$ | 200 to 700 |

5. The method of claim 1 wherein said mole proportions of ingredients fall within the following ranges:

| | |
|---|---|
| (1) M—$A_2O$ | 14 to 18 |
| (2) M'O | 1.0 |
| (3) $Al_2O_3$ | 0.5 to 1.0 |
| (4) $SiO_2$ | 14 to 18 |
| (5) $H_2O$ | 200 to 350 |

6. The method of claim 1 wherein M—A is sodium.

7. The method of claim 1 wherein M' is boron.

8. The method of claim 1 wherein the amount of the composition of step (a) added is 0.25 to 15 percent.

9. The method of claim 1 wherein crystalline zeolite having a particle size on the order of 0.1 to 1.0 micron is obtained by using an amount of the composition of step (a) ranging from 15 to 30 percent.

10. The method of claim 9 wherein the crystalline zeolite has an average particle size of 0.1 to 0.3 micron.

11. The method of claim 1 wherein said crystalline zeolite is type X zeolite.

12. The method of claim 1 wherein said zeolite is type Y zeolite.

References Cited

UNITED STATES PATENTS

| | | | |
|---|---|---|---|
| 3,328,119 | 6/1967 | Robson | 423—329 X |
| 3,431,219 | 3/1969 | Argauer | 252—455 Z |
| 3,574,538 | 4/1971 | McDaniel et al. | 423—329 |

FOREIGN PATENTS

| | | | |
|---|---|---|---|
| 984,502 | 2/1965 | Great Britain | 23—113 |
| 1,412,923 | 10/1965 | France | 23—113 |
| 1,188,584 | 4/1970 | Great Britain | 23—111 |

OTHER REFERENCES

Selbin et al., "J. Inorg. Nucl. Chem.," 1961, vol. 20, pp. 222–228

EDWARD J. MEROS, Primary Examiner

U.S. Cl. X.R.

423—328, 330